(12) United States Patent
Shimizu et al.

(10) Patent No.: US 7,789,799 B2
(45) Date of Patent: \*Sep. 7, 2010

(54) PARKING CONTROL SYSTEM FOR VEHICLE

(75) Inventors: Katsutoshi Shimizu, Nukata (JP); Kazuo Takemoto, Anjo (JP); Saijiro Tanaka, Setagaya (JP)

(73) Assignee: Aisin AW Co., Ltd., Anjo (JP)

( * ) Notice: Subject to any disclaimer, the term of this patent is extended or adjusted under 35 U.S.C. 154(b) by 608 days.

This patent is subject to a terminal disclaimer.

(21) Appl. No.: 11/723,879

(22) Filed: Mar. 22, 2007

(65) Prior Publication Data

US 2007/0225117 A1     Sep. 27, 2007

Related U.S. Application Data

(60) Provisional application No. 60/785,984, filed on Mar. 27, 2006.

(30) Foreign Application Priority Data

Mar. 24, 2006   (JP)   ............................... 2006-084050

(51) Int. Cl.
*B60W 10/18*     (2006.01)
*F02D 9/06*      (2006.01)

(52) U.S. Cl. ........................................ 477/182; 477/188

(58) Field of Classification Search ................. 477/182, 477/188; 701/70; 303/20; 192/219.4, 219, 192/220.2

See application file for complete search history.

(56) References Cited

U.S. PATENT DOCUMENTS

| | | | |
|---|---|---|---|
| 4,301,901 A * | 11/1981 | Jensen | 192/219.6 |
| 5,696,679 A | 12/1997 | Marshall et al. | |
| 6,401,899 B1 * | 6/2002 | Kanehisa et al. | 192/219.5 |
| 6,736,754 B2 | 5/2004 | Davids et al. | |
| 6,879,480 B2 * | 4/2005 | Kalia | 361/160 |
| 2003/0087727 A1 | 5/2003 | Loibl | |
| 2004/0113486 A1 | 6/2004 | Koga et al. | |
| 2007/0068748 A1 * | 3/2007 | Chittka | 188/72.7 |

FOREIGN PATENT DOCUMENTS

| | | |
|---|---|---|
| DE | 196 43 812 A1 | 5/1998 |
| DE | 100 28 350 A1 | 12/2001 |
| DE | 100 40 127 A1 | 2/2002 |
| DE | 10 2004 047 102 B3 | 3/2006 |
| JP | U-60-191568 | 12/1985 |
| JP | A-2004-169877 | 6/2004 |
| JP | A-2004-175203 | 6/2004 |
| JP | A 2004-243927 | 9/2004 |

\* cited by examiner

*Primary Examiner*—Tisha D Lewis
(74) *Attorney, Agent, or Firm*—Oliff & Berridge, PLC

(57) ABSTRACT

A parking control system includes a range-switching device that operates in conjunction with the range selection device and that switches the lock mechanism to an engaged state and a released state in conjunction with a switching of one of the driving range and the non-driving range of the drive unit; a vehicle parking brake unit that is operated based on an electric range position signal, which corresponds to the driving range and the non-driving range of the drive unit, and that switches a brake unit, which is provided to stop a rotation of the rotating member of the vehicle, between a braking state and a released state; and a control unit that operates the vehicle parking brake unit based on the range position signal of the vehicle.

11 Claims, 10 Drawing Sheets

ENGINE ECU

PARKING CONTROL SYSTEM FOR VEHICLE

CROSS-REFERENCE TO RELATED APPLICATIONS

This application claims priority to Provisional Application No. 60/785,984, filed Mar. 27, 2006, the entire disclosure of which is incorporated herein by reference in its entirety.

The disclosure of Japanese Patent Application No. 2006-084050 filed Mar. 24, 2006, including the specification, drawings and abstract is incorporated herein by reference in its entirety.

BACKGROUND

The present invention relates to a vehicle parking control system.

A parking brake is well known as a conventional method of holding a vehicle in a stopped state when it is parked. The parking brake is generally structured from a parking brake main body that is provided on a wheel and a lever member (or a pedal member) that is connected by a cable and is operated by an occupant of the vehicle.

Also, in a vehicle equipped with an automatic transmission, a parking mechanism, which is a lock mechanism that is provided in the automatic transmission, is also well known as a method of holding the vehicle in a stopped state. The parking mechanism functions such that when the shift lever is moved into the Park range (P range), a parking pawl that is connected to the shift lever engages a parking gear that is fixed to an output shaft of the automatic transmission, thereby stopping the rotation of the output shaft and preventing (stopping) the rotation of a wheel of the vehicle, such as a driving wheel that is connected to the output shaft through a rotating member.

Therefore, when parking, the occupant must execute separately the above two methods in order to hold the vehicle in a stopped state. That is, the occupant must move the shift lever into the Park range (P range) to put the parking mechanism into an engaged state and also pull the hand brake, which is the lever member, to put the parking brake into a braking state.

Accordingly, as shown in Japanese Patent Application Publication No. JP-A-2004-243927, a vehicle shift apparatus has been proposed in which the automatic transmission shift lever and the parking brake operate in conjunction. That is, the vehicle shift apparatus mechanically couples the shift lever and the parking brake. Specifically, the vehicle shift apparatus is structured such that the shift lever is connected to a brake cable, and when the shift lever moves to the Park range position from the Reverse range position, which is adjacent to the Park range position, the brake cable becomes taut and the parking brake operates.

SUMMARY

In the vehicle shift apparatus described in Japanese Patent Application Publication No. JP-A-2004-243927, the parking mechanism can be put into the engaged state and the parking brake can be put into the braking state by the single operation of moving the shift lever into the Park range position, which prevents the occupant from forgetting to apply the parking brake. However, because the shift lever and the parking brake lever member operate in conjunction, the parking brake cannot exert sufficient braking force until the shift lever arrives at the Park range position. There is also concern that if the tension in the parking brake cable decreases due to the cable's stretching or the like, the parking brake might not exert a sufficient braking force even when the shift lever is positioned at the Park range position.

The present invention thus provides, among other things, a vehicle parking control system that solves the problems described above by quickly and reliably providing sufficient braking force to the parking brake when the shift range of the automatic transmission changes, while also reliably preventing the occupant from forgetting to apply the parking brake.

An exemplary vehicle parking control system is used for a vehicle with a drive unit and a range selection device, the drive unit including an output shaft that is connected through a rotating member to a wheel of the vehicle and a lock mechanism that disengageably engages the output shaft to prevent the output shaft from rotating, and the range selection device being operated by an operator that is capable of selecting a driving range and a non-driving range of the drive unit. The parking control system includes a range-switching device that operates in conjunction with the range selection device and that switches the lock mechanism to an engaged state and a released state in conjunction with a switching of one of the driving range and the non-driving range of the drive unit; a vehicle parking brake unit that is operated based on an electric range position signal, which corresponds to the driving range and the non-driving range of the drive unit, and that switches a brake unit, which is provided to stop a rotation of the rotating member of the vehicle, between a braking state and a released state; and a control unit that operates the vehicle parking brake unit based on the range position signal of the vehicle.

An exemplary vehicle parking control system is used for a vehicle with an automatic transmission and a range selection device, the automatic transmission including an output shaft that is connected through a rotating member to a wheel of the vehicle and a lock mechanism that disengageably engages the output shaft to prevent the'output shaft from rotating, and the range selection device being operated by an operator that is capable of selecting a driving range and a non-driving range of the automatic transmission. The parking control system includes a range-switching device that operates in conjunction with the range selection device and that switches the lock mechanism to an engaged state and a released state in conjunction with a switching of one of the driving range and the non-driving range of the automatic transmission; a vehicle parking brake unit that is operated based on an electric range position signal, which corresponds to the driving range and the non-driving range of the automatic transmission, and that switches a brake unit, which is provided to stop a rotation of the rotating member of the vehicle, between a braking state and a released state; and a control unit that operates the vehicle parking brake unit based on the range position signal of the vehicle.

An exemplary vehicle parking control system is used for a vehicle with a drive unit and a range selection device, the drive unit including an output shaft that is connected through a rotating member to a wheel of the vehicle and a lock mechanism that disengageably engages the output shaft to prevent the output shaft from rotating, and the range selection device being operated by an operator that is capable of selecting a driving range and a non-driving range of the drive unit. The parking control system includes a range-switching device that operates in conjunction with the range selection device and that switches the lock mechanism to an engaged state and a released state in conjunction with a switching of one of the driving range and the non-driving range of the drive unit; a vehicle parking brake unit that is operated based on an electric range position signal, which corresponds to the driving range and the non-driving range of the drive unit, and that switches a brake unit, which is provided to stop a rotation of the rotating member of the vehicle, between a braking state and a released state; and a control unit that operates the vehicle parking brake unit based on the range position signal of the vehicle. The range position signal corresponds to one of a Reverse range and a Drive range, which are driving ranges of the drive unit, and a Neutral range and a Park range, which are non-driving ranges of the drive unit. When the range position signal is switched to the Park range, the control unit sets the brake unit to a braking state.

An exemplary vehicle parking control system is used for a vehicle with a drive unit and a range selection device, the drive unit including an output shaft that is connected through a rotating member to a wheel of the vehicle and a lock mechanism that disengageably engages the output shaft to prevent the output shaft from rotating, and the range selection device being operated by an operator that is capable of selecting a driving range and a non-driving range of the drive unit. The parking control system includes a range-switching device that operates in conjunction with the range selection device and that switches the lock mechanism to an engaged state and a released state in conjunction with a switching of one of the driving range and the non-driving range of the drive unit; a vehicle parking brake unit that is operated based on an electric range position signal, which corresponds to the driving range and the non-driving range of the drive unit, and that switches a brake unit, which is provided to stop a rotation of the rotating member of the vehicle, between a braking state and a released state; and a control unit that operates the vehicle parking brake unit based on the range position signal of the vehicle. The range position signal corresponds to one of a Reverse range and a Drive range, which are driving ranges of the drive unit, and a Neutral range and a Park range, which are non-driving ranges of the drive unit. When the range position signal is switched out of the Park range, the control unit sets the brake unit to a released state.

An exemplary vehicle parking control system is used for a vehicle with a drive unit and a range selection device, the drive unit including an output shaft that is connected through a rotating member to a wheel of the vehicle and a lock mechanism that disengageably engages the output shaft to prevent the output shaft from rotating, and the range selection device being operated by an operator that is capable of selecting a driving range and a non-driving range of the drive unit. The parking control system includes a range-switching device that operates in conjunction with the range selection device and that switches the lock mechanism to an engaged state and a released state in conjunction with a switching of one of the driving range and the non-driving range of the drive unit; vehicle parking brake unit that is operated based on an electric range position signal, which corresponds to the driving range and the non-driving range of the drive unit, and that switches a brake unit, which is provided to stop a rotation of the rotating member of the vehicle, between a braking state and a released state; and a control unit that operates the vehicle parking brake unit based on the range position signal of the vehicle. The range position signal corresponds to one of a Reverse range and a Drive range, which are driving ranges of the drive unit, and a Neutral range and a Park range, which are non-driving ranges of the drive unit. When the range position signal is switched to the Park range, the control unit sets the brake unit to a braking state. When the range position signal is switched out of the Park range, the control unit sets the brake unit to a released state.

An exemplary vehicle parking control system is used for a vehicle with an automatic transmission and a range selection device, the automatic transmission including an output shaft that is connected through a rotating member to a wheel of the vehicle and a lock mechanism that disengageably engages the output shaft to prevent the output shaft from rotating, and the range selection device being operated by an operator that is capable of selecting a driving range and a non-driving range of the automatic transmission. The parking control system a range-switching device that operates in conjunction with the range selection device and that switches the lock mechanism to an engaged state and a released state in conjunction with a switching of one of the driving range and the non-driving range of the automatic transmission; a vehicle parking brake unit that is operated based on an electric range position signal, which corresponds to the driving range and the non-driving range of the automatic transmission, and that switches a brake unit, which is provided to stop a rotation of the rotating member of the vehicle, between a braking state and a released state; and a control' unit that operates the vehicle parking brake unit based on the range position signal of the vehicle. The range position signal corresponds to one of a Reverse range and a Drive range, which are driving ranges of the automatic transmission, and a Neutral range and a Park range, which are non-driving ranges of the automatic transmission. When the range position signal is switched to the Park range, the control unit sets the brake unit to a braking state.

An exemplary vehicle parking control system for a vehicle with an automatic transmission and a range selection device, the automatic transmission including an output shaft that is connected through a rotating member to a wheel of the vehicle and a lock mechanism that disengageably engages the output shaft to prevent the output shaft from rotating, and the range selection device being operated by an operator that is capable of selecting a driving range and a non-driving range of the automatic transmission. The parking control system includes a range-switching device that operates in conjunction with the range selection device and that switches the lock mechanism to an engaged state and a released state in conjunction with a switching of one of the driving range and the non-driving range of the automatic transmission; a vehicle parking brake unit that is operated based on an electric range position signal, which corresponds to the driving range and the non-driving range of the automatic transmission, and that switches a brake unit, which is provided to stop a rotation of the rotating member of the vehicle, between a braking state and a released state; and a control unit that operates the vehicle parking brake unit based on the range position signal of the vehicle. The range position signal corresponds to one of a Reverse range and a Drive range, which are driving ranges of the automatic transmission, and a Neutral range and a Park range, which are non-driving ranges of the automatic transmission. When the range position signal is switched out of the Park range, the control unit sets the brake unit to a released state.

An exemplary vehicle parking control system is used for a vehicle with an automatic transmission and a range selection device, the automatic transmission including an output shaft that is connected through a rotating member to a wheel of the vehicle and a lock mechanism that disengageably engages the output shaft to prevent the output shaft from rotating, and the range selection device being operated by an operator that is capable of selecting a driving range and a non-driving range of the automatic transmission. The parking control system includes a range-switching device that operates in conjunction with the range selection device and that switches the lock mechanism to an engaged state and a released state in conjunction with a switching of one of the driving range and the non-driving range of the automatic transmission; a vehicle parking brake unit that is operated based on an electric range position signal, which corresponds to the driving range and the non-driving range of the automatic transmission, and that switches a brake unit, which is provided to stop a rotation of the rotating member of the vehicle, between a braking state and a released state; and a control unit that operates the vehicle parking brake unit based on the range position signal of the vehicle. The range position signal corresponds to one of a Reverse range and a Drive range, which are driving ranges of the automatic transmission, and a Neutral range and a Park range, which are non-driving ranges of the automatic transmission. When the range position signal is switched to the Park range, the control unit sets the brake unit to a braking state. When the range position signal is switched out of the Park range, the control unit sets the brake unit to a released state.

BRIEF DESCRIPTION OF THE DRAWINGS

Various exemplary embodiments will be described with reference to the drawings, wherein.

DETAILED DESCRIPTION OF EMBODIMENTS

Figure 1:
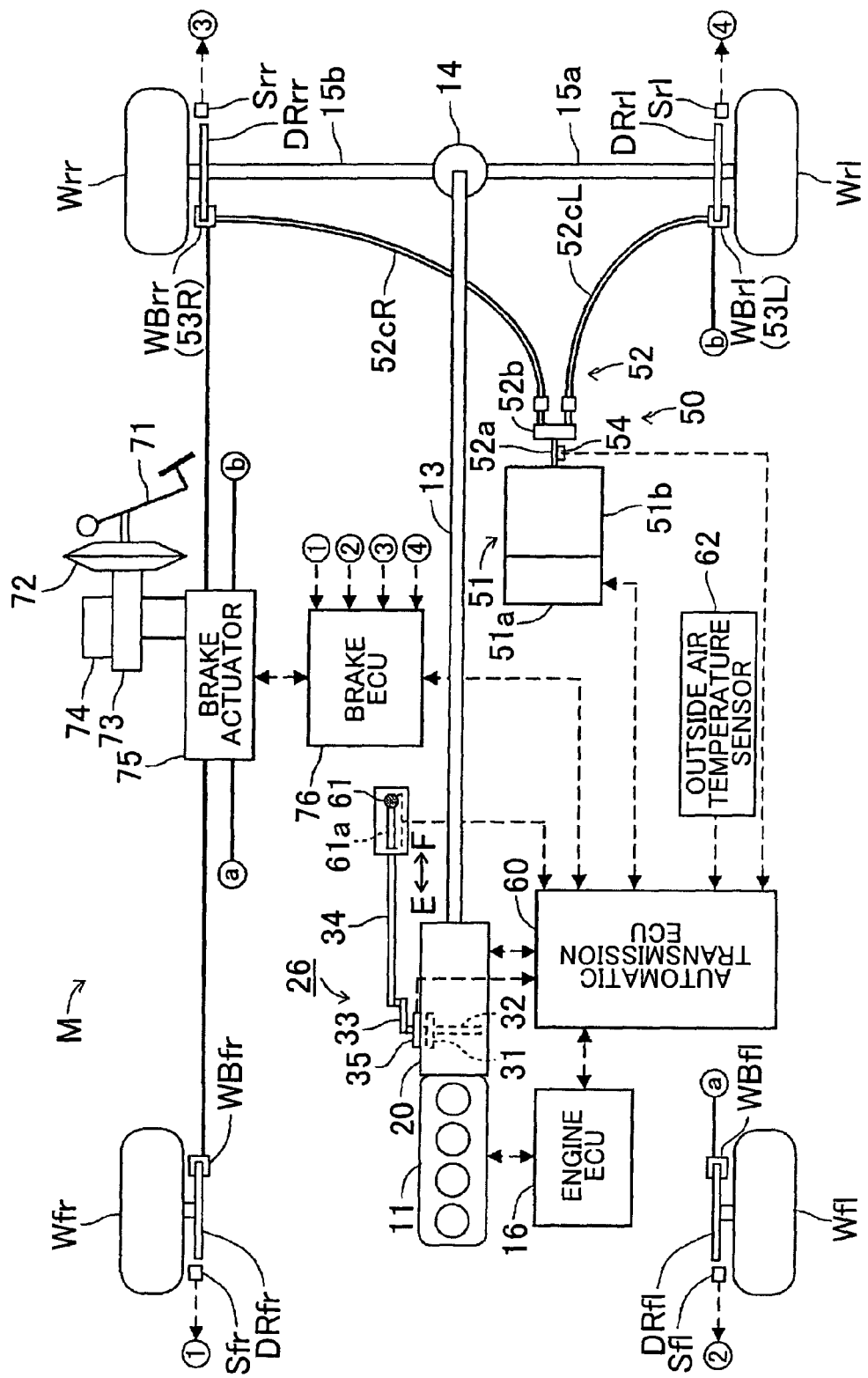
FIG. 1 is a schematic diagram that shows an embodiment of a vehicle parking control system according to the present invention.
Figure 2:
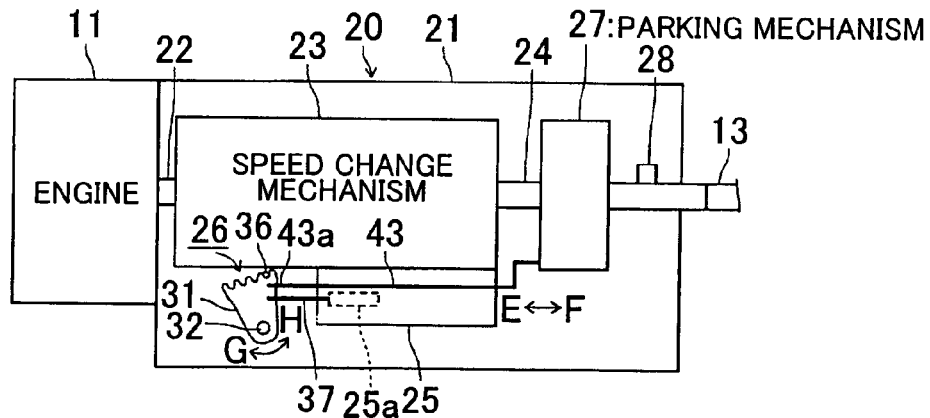
FIG. 2 is a schematic diagram that shows the structure of an automatic transmission shown in FIG. 1.
Figure 3:
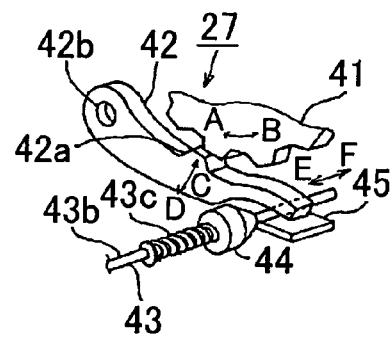
FIG. 3 is an oblique view that shows a parking mechanism shown in FIG. 2.
Figure 4:
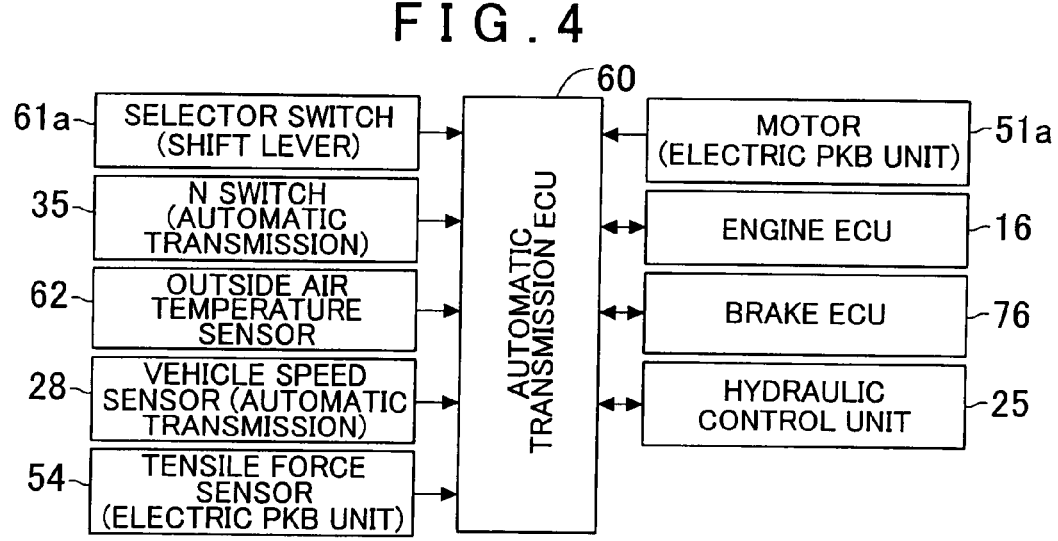
FIG. 4 is a schematic diagram that shows the structure of an automatic transmission ECU shown in FIG. 1.

An embodiment of a vehicle parking control system according to the present invention will be explained below with reference to the drawings. FIG. 1 is a schematic diagram that shows the structure of the vehicle parking control system. FIG. 2 is a schematic diagram that shows the structure of an automatic transmission. FIG. 3 is an oblique view that shows a parking mechanism. FIG. 4 is a schematic diagram that shows the structure of an automatic transmission ECU shown in FIG. 1.

The vehicle M is a rear-wheel drive vehicle equipped with an automatic transmission 20, which is a drive unit. The vehicle M is of a type in which a driving force of an engine 11, which is a prime mover mounted in a front portion of the vehicle body, is transmitted through the automatic transmission 20 to a rear wheel, which is a driving wheel. Note that the vehicle M may also be a front-wheel drive vehicle or a four-wheel drive vehicle, for example, instead of a rear-wheel drive vehicle.

The vehicle M is equipped with the vehicle parking control system. The vehicle parking control system is equipped with a range-switching device 26, which is provided in the automatic transmission 20, an electric parking brake unit (hereinafter called an electric PKB unit) 50, which is a parking unit, and the automatic transmission electronic control unit (ECU) 60.

The automatic transmission 20 shifts the speed of the driving force of the engine 11 and transmits it through a propeller shaft 13, a differential 14, and left and right drive shafts 15a, 15b respectively to the left and right rear wheels Wrl, Wrr, which are the driving wheels. As shown in FIG. 2, the automatic transmission 20 is provided with a casing 21. An input shaft 22, a speed change mechanism 23, an output shaft 24, a hydraulic control unit 25, the range-switching device 26, and the parking mechanism 27 are disposed within the casing 21.

The input shaft 22 inputs the driving force from the engine 11. The speed change mechanism 23 includes a torque converter, a planetary gear train, and the like. The speed change mechanism 23 receives commands from the hydraulic control unit 25, shifts gear speeds (shifting and inverse rotation) to shift the speed of the driving force input by the input shaft 22, and outputs the driving force. The output shaft 24, through the propeller shaft 13, outputs to the driving wheels (Wrl, Wrr) the driving force that was shifted by the speed change mechanism 23. Note that a rotating member that is described in the claims serves as a member that is interposed between the output shaft 24 and a wheel (for example, a driving wheel) of the vehicle and that rotates according to the rotation of the output shaft 24. Also, so long as the rotating member is a member that rotates according to the rotation of the output shaft 24, it may be any member and is not limited to being a member that transmits power from the output shaft 24. Also, among the rotating members, a parking gear 41, described later, that is provided as a single unit with the output shaft 24, serves as a first rotating member. Disc rotors DRfl, DRfr, DRrl, DRrr, which rotate as single units with wheels Wfl, Wfr, Wrl, Wrr of the vehicle, serve as second rotating members. The parking gear 41 and the disc rotors are described later.

The hydraulic control unit 25 controls the planetary gear train by automatically switching the oil passages for the brakes and the clutches for various gears in the planetary gear train. As shown in FIG. 2, the hydraulic control unit 25 is provided with a manual valve 25a, which is driven by the range-switching device 26. The manual valve 25a switches line pressure oil passages to match a range selected by a shift lever 61, thereby switching the operating state of the automatic transmission 20 to various shift ranges, such as the P range (Park range), R range (Reverse range), N range (Neutral range), D range (Drive range), and the like. Selectable ranges are set for the shift lever 61 that correspond to the various shift ranges of the automatic transmission 20. Also, the manual valve 25a, which is disposed within the hydraulic control unit 25 of the automatic transmission 20, can be moved to a P position that corresponds to the P range, an R position that corresponds to the R range, an N position that corresponds to the N range, a D position that corresponds to the D range, and the like. Moving the manual valve 25a in the axial direction switches oil passages within the hydraulic control unit 25 such that the shift range of the automatic transmission 20 is set to the range selected by the shift lever 61, that is, the requested range. Note that in this embodiment, the Reverse range and the Drive range of the automatic transmission 20 serve as driving ranges. The Neutral range and the Park range of the automatic transmission 20 serve as non-driving ranges.

As shown in FIGS. 1 and 2, the range-switching device 26 is linked to the shift lever 61 (described later), which is a range selection device that selects a shift range of the automatic transmission 20 for a desired shift range. The range-switching device 26 switches the shift range of the automatic transmission 20 and switches the parking mechanism 27, which is provided in the automatic transmission 20, between an engaged state and a released state.

The range-switching device 26 is structured such that it includes a manual shaft 32, which is supported by the casing 21 of the automatic transmission 20 such that the manual shaft 32 rotates freely; a detent lever 31, an end portion of which is fastened to the manual shaft 32 to form a single piece with the manual shaft 32 such that the detent lever 31 rotates together with the manual shaft 32; an outer lever 33, which is fastened to a protruding end of the manual shaft 32 to form a single piece with the manual shaft 32 such that the outer lever 33 rotates together with the manual shaft 32; and a shift linkage 34, which links the outer lever 33 to the shift lever 61.

A parking rod 43 is connected to the other end portion of the detent lever 31, and the manual valve 25a is also connected to the other end portion of the detent lever 31 through a connecting member 37. Thus, when the detent lever 31 rotates in the directions indicated by arrow G-H in FIG. 2, the parking rod 43 and the manual valve 25a move in the axial direction (the direction indicated by arrow E-F in FIG. 1).

Around an edge of the other end portion of the detent lever 31, a plurality of range grooves are formed that are disengageably engaged by a roller 36, which is supported by a tip of a detent spring (omitted from the drawings), such that the roller 36 rotates freely. The range grooves correspond to the P position, the R position, the N position, and the D position of the manual valve 25a. For example, in FIG. 2, the range groove on the right end corresponds to the D range, and the range groove on the left end corresponds to the P range. FIG. 2 shows a state in which the roller 36 is engaged with the range groove on the right end, that is, a state in which the automatic transmission 20 is in the D range. Also, FIG. 1 shows the shift lever 61 in a state of being in the D range.

In the range-switching device 26 structured in this manner, when the shift lever 61 is operated in the direction indicated by arrow E, the shift linkage 34 is moved in the direction indicated by arrow F, and the outer lever 33 is swung (rotated) in the direction indicated by arrow G. In conjunction with this movement, the detent lever 31 swings in the direction indicated by arrow G, causing the parking rod 43 and the manual valve 25a to be moved in the direction indicated by arrow F. Also when the shift lever 61 is moved in the direction indicated by arrow F, the shift linkage 34 is moved in the direction indicated by arrow E, and the outer lever 33 is swung (rotated) in the direction indicated by arrow H. In conjunction with this movement, the detent lever 31 swings in the direction indicated by arrow H, causing the parking rod 43 and the manual valve 25a to be moved in the direction indicated by arrow E.

Note that it is desirable for the range-switching device 26 to be structured such that, when the shift lever 61 is changed from the R range to the P range, the parking mechanism 27 changes from the released state to the engaged state at or before the time that parking brakes 53 change from a released state to a braking state. It is also desirable for the range-switching device 26 to be structured such that, when a change is made from the P range to the R range, the parking brakes 53 change from the braking state to the released state at or after the time when the parking mechanism 27 changes from the engaged state to the released state. For example, a device may be interposed in the shift linkage 34 such that when the shift lever 61 is changed from the R range to the P range, the device contracts in the axial direction, thereby delaying the transmission of the force of the shift lever 61 to the outer lever 33, and when the shift lever 61 is changed from the P range to the R range, the device extends in the axial direction, thereby speeding up the transmission of the force of the shift lever 61 to the outer lever 33.

The automatic transmission 20, as shown in FIG. 1, is equipped with a neutral start switch (hereinafter called the N switch) 35. The N switch 35 is attached to the casing 21 of the automatic transmission 20 and is a range state detection device that detects the shift range state, which is the operating state of the automatic transmission 20, through a contact point that moves in conjunction with the shift lever 61, that is, the manual shift 32. A contact point pattern signal (or a converted pattern signal in which the contact point pattern signal is converted to a corresponding range), which is a detection result (detection signal) detected by the N switch 35, is output to the automatic transmission ECU 60.

The parking mechanism 27 is the lock mechanism of the automatic transmission and, as mainly shown in FIG. 3, is structured from the parking gear 41, a parking pawl 42, the parking rod 43, and a cam 44. The parking mechanism 27 executes parking locking by stopping the rotation of the output shaft 24. The parking mechanism 27 stops the rotation of the output shaft 24 by causing a tooth 42a of the parking pawl 42 to engage with the parking gear 41, which is the first rotating member and is provided as a single unit with the output shaft 24. That is, the parking mechanism 27 is a mechanism that prevents the rotation of the output shaft 24 by causing the tooth 42a of the parking pawl 42 to engage with the parking gear 41 and thereby prevents the rotation of the vehicle wheels, which are end portions of a torque transmission route of the output shaft 24. Note that in this embodiment, the parking gear 41 is provided as a single unit with the output shaft 24, but it does not necessarily have to be provided as a single unit with the output shaft 24, so long as it is able to prevent the rotation of the gears in the drive unit, which includes a manual transmission, an automatic transmission capable of controlling a plurality of gear ratios, and a reduction gear mechanism or the like in a hybrid or the like. In this embodiment, the parking mechanism 27, which is the lock mechanism of the automatic transmission, is explained in detail, but in the case of a hybrid or the like, a lock mechanism that is provided in a drive unit that decreases and increases the rotation of a motor can be used in the same manner.

As the output shaft 24 rotates, the parking gear 41 rotates as indicated by arrow A-B in FIG. 3. The parking pawl 42 is disposed such that it rotates freely in the directions indicated by arrow C-D in FIG. 3 around a support point 42b, which is fastened to the casing 21. The parking pawl 42 is energized in the arrow D direction by a spring not shown in FIG. 3.

The parking rod 43 is disposed such that it extends parallel to the output shaft 24. A base end portion 43a of the parking rod 43 is connected to the detent lever 31 such that the parking rod 43 moves reciprocally in the axial direction (the direction indicated by arrow E-F in FIG. 3) in conjunction with the rotation of the detent lever 31. The conical cam 44 is provided at a tip portion 43b of the parking rod 43. The cam 44 moves back and forth between the parking pawl 42 and a support member 45 according to the reciprocal movement of the parking rod 43, thereby causing the parking pawl 42 to rock. The cam 44 is fitted onto the parking rod 43 such that the cam 44 slides freely on the parking rod 43 and is energized toward the tip of the parking rod 43 (the F direction) by a spring 43c.

When the detent lever 31 is rotated, the parking rod 43 is moved toward the rear of the vehicle (the F direction), and the cam 44 is also moved toward the rear of the vehicle. When the position of a gear space on the parking gear 41 is aligned with the position of the tooth 42a on the parking pawl 42, the cam 44 moves into the space between the parking pawl 42 and the support member 45. This causes the parking pawl 42 to be rocked in the direction indicated by arrow C, in opposition to the energizing force of the spring not shown in FIG. 3, such that the parking pawl 42 is disposed in a position to engage the parking gear 41. Therefore, the tooth 42a enters a state of engagement with the gear space of the parking gear 41 such that the output shaft 24 and, as a consequence, the drive shaft is held stationary.

When the position of the gear space on the parking gear 41 is not aligned with the position of the tooth 42a on the parking pawl 42, the tooth 42a enters a state of contact with the top land of a gear tooth on the parking gear 41, and a gap large enough for the cam 44 to move between the parking pawl 42 and the support member 45 is not formed. Therefore, even though the parking rod 43 is moved into the parking position, the movement of the cam 44 is restricted by the parking pawl 42 and the support member 45. At this time, the cam 44 is energized toward the rear of the vehicle (the arrow F direction) by the spring 43c. This causes the parking pawl 42 to be energized in the direction indicated by arrow C and to enter a parking waiting state, as it were, in which the tooth 42a presses against the parking gear 41. Thereafter, if the output shaft 24 rotates only slightly, such that the position of the gear space on the parking gear 41 is aligned with the position of the tooth 42a on the parking pawl 42, the cam 44 is moved by the energizing force of the spring 43c in the direction indicated by arrow F and moves into the space between the parking pawl 42 and the support member 45. This causes the parking pawl 42 to be rocked in the direction indicated by arrow C, in opposition to the energizing force of the spring not shown in FIG. 3, such that the parking pawl 42 is disposed in an engaged position and the parking mechanism 27 enters a state of engagement (parked state).

By contrast, when the detent lever 31 is rotated, the parking rod 43 is moved toward the front of the vehicle (the E direction) from the parking position, and the cam 44 is also moved toward the front of the vehicle between the parking pawl 42 and the support member 45. The energizing force of the spring not shown in FIG. 3 in the arrow D direction therefore rocks the parking pawl 42 in a direction that separates it from the parking gear 41 (the arrow D direction). At the same time, the state of engagement between the tooth 42a and the gear space of the parking gear 41 is released (that is, enters a released state), such that the output shaft 24 and, as a consequence, the drive shaft are allowed to rotate.

Therefore, the range-switching device 26 switches the shift range of the automatic transmission 20 in conjunction with the operation of the shift lever 61 and also operates the parking mechanism 27 that is provided in the automatic transmission 20.

The electric PKB unit 50, which is the vehicle parking brake unit, is operated automatically based on a range position signal and switches the parking brakes 53, which are brake units that are provided in the vehicle M, to the braking state and the released state. That is, the electric parking brake unit 50, which is the vehicle parking brake unit, is operated automatically based on the range position signal and operates the parking brakes 53, which are brake units that are provided in the vehicle M. The electric parking brake unit 50 also switches the vehicle M to a parked state and a released state by operating the vehicle's parking brakes 53.

The electric PKB unit 50 is structured from a parking brake actuator portion 51 (hereinafter called a PKB actuator portion), a wire structure portion 52, a pair of left and right parking brakes 53L, 53R, which are provided on the left and right rear wheels Wrl, Wrr, a tensile force sensor 54, and the like.

The PKB actuator portion 51 is structured from a motor 51a, which serves as an electric driving device and can rotate both forwards and in reverse, and a deceleration mechanism 51b, which serves as a power transmission and cut-off mechanism and is made up of a plurality of gear trains that are structured such that the driving force of the motor 51a can be transmitted to the wire structure portion 52, while power based on tensile force from the wire structure portion 52 is not transmitted to the motor 51a. The motor 51a is controlled based on the range position signal, which is a command signal from the automatic transmission ECU 60.

The wire structure portion 52 is structured from a base wire 52a, an end of which is connected to the deceleration mechanism 51b; a balancer 52b, a center portion of a side of which is connected to another end of the base wire 52a; and a left wire 52cL and a right wire 52cR, each of which has an end that is connected to an edge of another side of the balancer 52b and which have other ends that are respectively connected to the left-right pair of parking brakes 53L, 53R.

The balancer 52b inclines as necessary in the direction of vehicle yaw such that the tensile force on the left wire 52cL and the tensile force on the right wire 52cR are always of the same magnitude, even if there is initial dimensional variation in the length of the left wire 52cL and the length of the right wire 52cR or if differences arise due to aging changes or the like.

The left-right pair of parking brakes 53L, 53R are one-piece type parking brakes in which operating mechanisms are respectively incorporated into wheel brakes WBrl, WBrr. The parking brakes 53L, 53R are structured such that they respectively generate a braking force on the left and right rear wheels Wrl, Wrr according to the tensile force of the left wire 52cL and the right wire 52cR (that is, according to the tensile force of the base wire 52a). Therefore, the action of the balancer 52b causes equal braking forces to be generated in the left-right pair of parking brakes 53L, 53R.

The tensile force sensor 54 is provided on the base wire 52a. The tensile force sensor 54 detects the tensile force on the base wire 52a and outputs a signal to the automatic transmission ECU 60 that indicates a tensile force Fw on the base wire 52a.

The automatic transmission ECU 60 is a control unit that operates the electric PKB unit 50 based on the relationship between the range position signal and the Park range of the vehicle M. As described above, the N switch 35, the motor 51a and the tensile force sensor 54 of the electric PKB unit 50, and the hydraulic control unit 25 are connected to the automatic transmission ECU 60. Also, as mainly shown in FIG. 4, a selector switch 61a of the shift lever 61, an outside air temperature sensor 62, and a vehicle speed sensor 28 of the automatic transmission 20 are connected to the automatic transmission ECU 60. An engine electronic control unit (ECU) 16, and a brake electronic control unit (ECU) 76 are also connected to the automatic transmission ECU 60 such that they can communicate with one another.

The automatic transmission ECU 60 has a microcomputer (omitted from the drawings), and the microcomputer is equipped with input/output interfaces, which are connected through a bus, a CPU, a RAM, and a ROM (all omitted from the drawings). The CPU executes programs that correspond to the flowcharts in FIGS. 6 to 12 and controls the engage/release switching of the parking brakes 53L, 53R. The RAM temporarily stores variables that are required for the execution of the programs. The ROM stores the programs.

The selector switch 61a is provided on the shift lever 61 and is a range detection device that detects the selected range and outputs a range signal, which is a range detection signal, to the automatic transmission ECU 60. The selector switch 61a forms a portion of the range selection device.

The outside air temperature sensor 62 detects the air temperature outside the vehicle M and outputs an outside air temperature detection signal to the automatic transmission ECU 60. The vehicle speed sensor 28 is provided in the automatic transmission 20. The vehicle speed sensor 28 detects the revolution speed of the output shaft 24, which correlates to the vehicle speed, and outputs the revolution speed to the automatic transmission ECU 60. The engine ECU 16 controls the engine 11. The engine ECU 16 inputs the revolution speed of the engine 11 and outputs it to the automatic transmission ECU 60.

The vehicle parking control system is also equipped with a hydraulic brake unit (wheel brake unit), which brakes the vehicle by directly applying hydraulic braking force to wheels Wfl, Wfr, Wrl, Wrr. The hydraulic brake unit is structured from a brake pedal 71, a vacuum booster 72, a master cylinder 73, a reservoir tank 74, a brake actuator 75, the brake ECU 76, wheel brakes WBfl, WBfr, WBrl, WBrr, and wheel speed sensors Sfl, Sfr, Srl, Srr, which respectively detect the wheel speeds of the wheels Wfl, Wfr, Wrl, Wrr.

Each of the wheel brakes WBfl, WBfr, WBrl, WBrr contains a piston (omitted from the drawings), which slides in a liquid-tight manner. When a base hydraulic pressure or a control hydraulic pressure is supplied to each of the wheel brakes WBfl, WBfr, WBrl, WBrr, each piston presses on a pair of brake pads. The pairs of brake pads then press from both sides on disc rotors DRfl, DRfr, DRrl, DRrr, which are, the second rotating members and which rotate as single units with the wheels Wfl, Wfr, Wrl, Wrr, thereby restricting the rotation of the disc rotors DRfl, DRfr, DRrl, DRrr. Note that disc brakes are used in this embodiment, but drum brakes may also be used.

The vacuum booster 72 is a servo unit that multiplies (increases) the brake operating force that is generated by the operation of depressing the brake pedal 71. The master cylinder 73 supplies brake fluid (oil) to cylinders in which the pistons in the wheel brakes WBfl, WBfr, WBrl, WBrr slide, at a hydraulic pressure (oil pressure) that is the base hydraulic pressure that corresponds to the brake operating force that is multiplied by the vacuum booster 72. The reservoir tank 74 stores the brake fluid and supplies the brake fluid to the master cylinder 73.

The brake actuator 75 is provided between the master cylinder 73 and the wheel brakes WBfl, WBfr, WBrl, WBrr and creates a control hydraulic pressure that is independent of the base hydraulic pressure that is generated in response to brake operating state. The brake actuator 75 also supplies the base hydraulic pressure by passing it on. The brake actuator 75 is provided with a control valve (electromagnetic), a hydraulic pressure source (motor, accumulator), and a reservoir and can independently apply the control hydraulic pressure and the base hydraulic pressure to the wheel brakes WBfl, WBfr, WBrl, WBrr. The brake ECU 76 controls the brake actuator 75.

In the hydraulic brake unit, the base hydraulic pressure is generated in the master cylinder 73 in response to the brake operating state that is created by the depressing of the brake pedal 71. Directly applying the generated base hydraulic pressure to each of the wheel brakes WBfl, WBfr, WBrl, WBrr causes a base hydraulic pressure braking force that corresponds to the base hydraulic pressure to be generated on each of the wheels Wfl, Wfr, Wrl, Wrr.

Also in the hydraulic brake unit, irrespective of the brake operating state that is created by the depressing of the brake pedal 71, the control hydraulic pressure is created in the brake actuator 75 based on the wheel speeds detected by each wheel speed sensor Sfl, Sfr, Srl, Srr. Independently applying the control hydraulic pressure to each of the wheel brakes WBfl, WBfr, WBrl, WBrr causes a control hydraulic pressure braking force to be generated independently on each of the wheels Wfl, Wfr, Wrl, Wrr.

The wheel brakes WBfl, WBfr, WBrl, WBrr may also be used as the parking brakes, and the hydraulic brake unit may be used as the vehicle parking brake unit. The wheel brakes have been explained using the disc rotors, which are the second rotating members, as the rotating members that stop the wheels of the vehicle, but anything that can stop the vehicle may be used.

Figure 5:
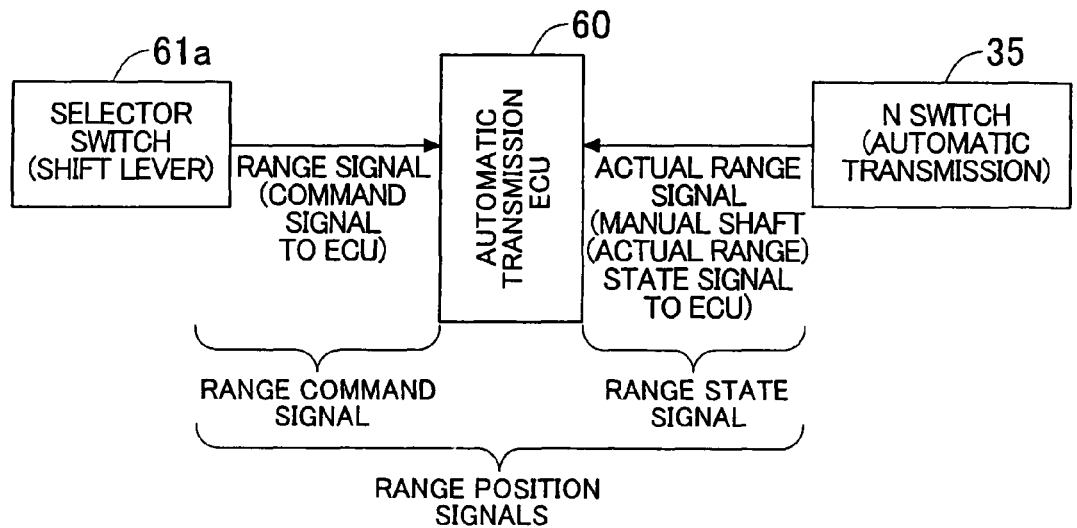
FIG. 5 is a drawing that explains range position signals.

As shown in FIG. 5, the selector switch 61a inputs the range signal, which is a command signal, to the automatic transmission ECU 60. The range signal is a range command signal to the automatic transmission ECU 60. From the N switch 35, the automatic transmission ECU 60 inputs a state (actual range) signal (that is, the automatic transmission range) for the manual shaft 32, that is, the pattern signal (or the converted pattern signal). The pattern signal is a range state signal. The range state signal is a signal by which a device that transmits or receives a signal notifies a device that receives or detects a signal of the actual range of the transmission or the drive unit. The range command signal and the range state signal are the range position signals. The range position signals are signals by which one device notifies another device of the actual range or of the switching of the actual range of the transmission or the drive unit, regardless of whether either device transmits or receives a signal or receives or detects a signal. Also, the range position signals, both the range command signal and the range state signal, include the Reverse range and the Drive range, which are the driving ranges of the automatic transmission (the drive unit), and the Neutral range and the Park range, which are the non-driving ranges of the automatic transmission (the drive unit). That is, the range position signals, both the range command signal and the range state signal, correspond to the Reverse range and the Drive range, which are the driving ranges of the automatic transmission (the drive unit), and the Neutral range and the Park range, which are the non-driving ranges of the automatic transmission (the drive unit).

Figure 6:
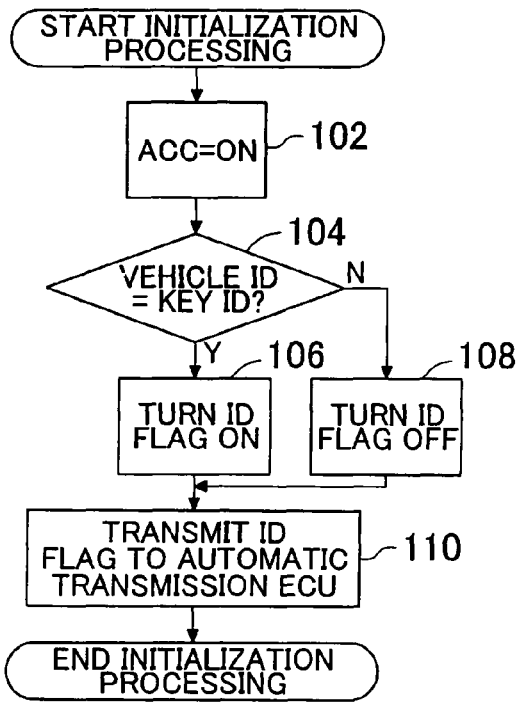
FIG. 6 is a flowchart of an initialization processing routine that is executed by an engine ECU shown in FIG. 1.

Next, the operation of the vehicle parking control system will be explained with reference to the flowcharts shown in FIGS. 6 to 12. When the vehicle's ignition switch is turned to ON, power is supplied to the engine ECU 16, and an initialization processing program shown in FIG. 6 is started.

The engine ECU 16 supplies accessory power (step 102). If a key ID of a key to the vehicle M is identical to a pre-set vehicle ID (YES at step 104), the engine ECU 16 sets an ID flag to ON (step 106). If the key ID is not identical to the vehicle ID (NO at step 104), the engine ECU 16 sets the ID flag to OFF (step 108). The engine ECU 16 transmits the set ID flag to the automatic transmission ECU 60 (step 110). With that, the initialization of the engine ECU 16 ends.

Figure 7:
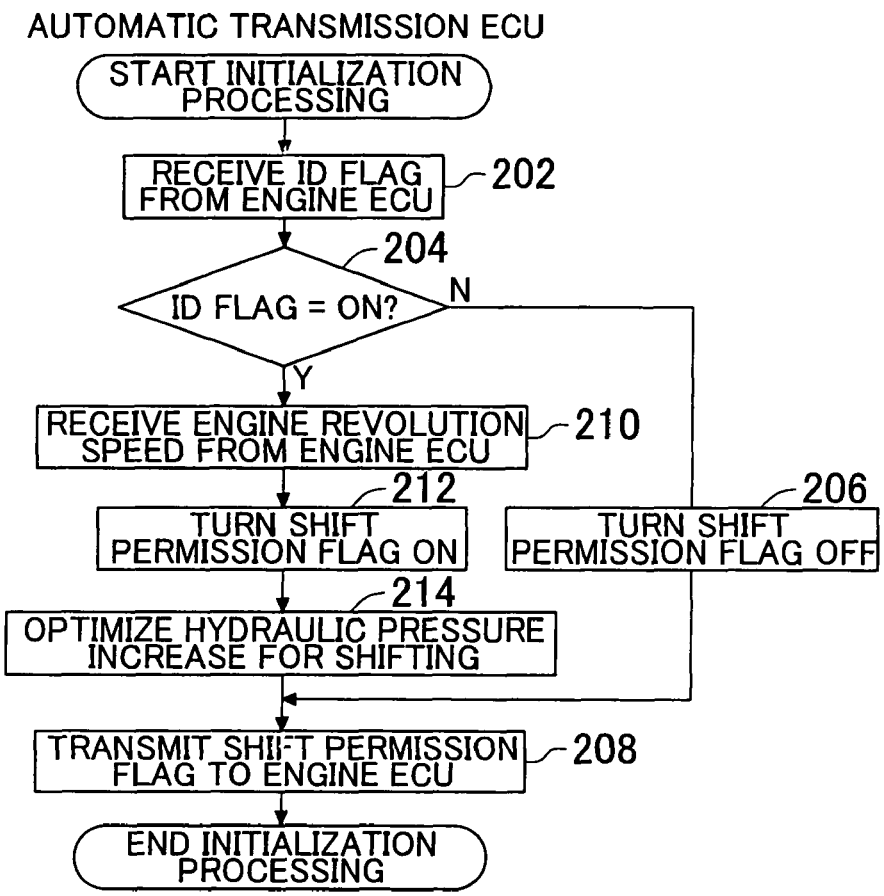
FIG. 7 is a flowchart of an initialization processing routine that is executed by the automatic transmission ECU shown in FIG. 1.

Also, when the vehicle's ignition switch is turned to ON, power is supplied to the automatic transmission ECU 60, and an initialization processing program shown in FIG. 7 is started. The automatic transmission ECU 60 receives the ID flag from the engine ECU 16 (step 202). If the received ID flag is OFF (NO at step 204), the automatic transmission ECU 60 sets a shift permission flag to OFF (step 206). The automatic transmission ECU 60 then transmits the shift permission flag to the engine ECU 16 (step 208).

Also, if the received ID flag is ON (YES at step 204), the automatic transmission ECU 60 receives an engine revolution speed from the engine ECU 16 (step 210), sets the shift permission flag to ON (step 212), and optimizes a hydraulic pressure increase for shifting (step 214). The automatic transmission ECU 60 then transmits the shift permission flag to the engine ECU 16 (step 208). With that, the initialization of the automatic transmission ECU 60 ends.

Figure 8:
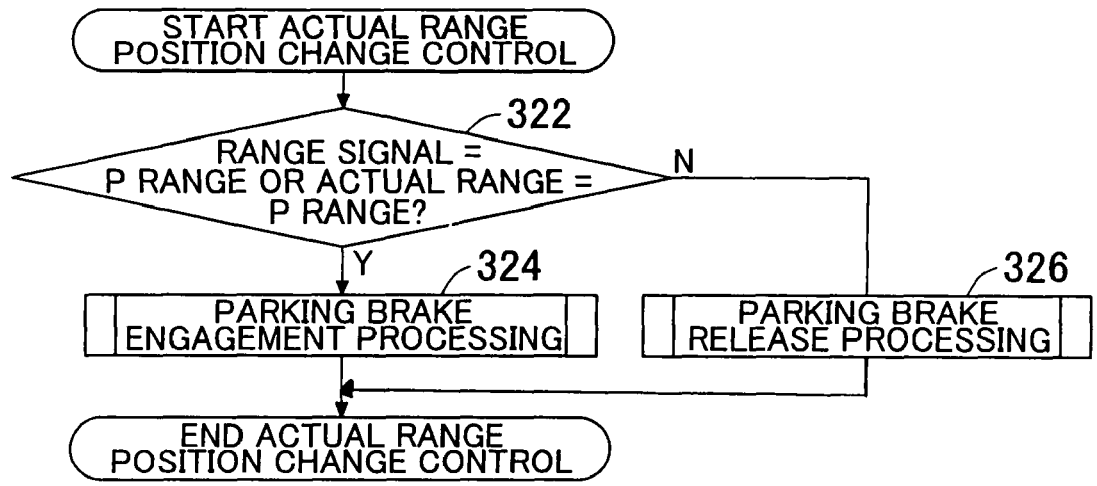
FIG. 8 is a flowchart of an actual range position change control routine that is executed by the automatic transmission ECU shown in FIG. 1.

Every time a specified short time interval elapses, the automatic transmission ECU 60, for which the initialization processing has ended as described above, executes an actual range position change control processing routine that is shown in FIG. 8. If the range signal is the Park range or the actual range signal is the Park range (YES at step 322), the automatic transmission ECU 60 executes parking brake engagement processing (step 324). If neither the range signal nor the actual range signal is the Park range (NO at step 322), the automatic transmission ECU 60 executes parking brake release processing (step 326).

Figure 9:
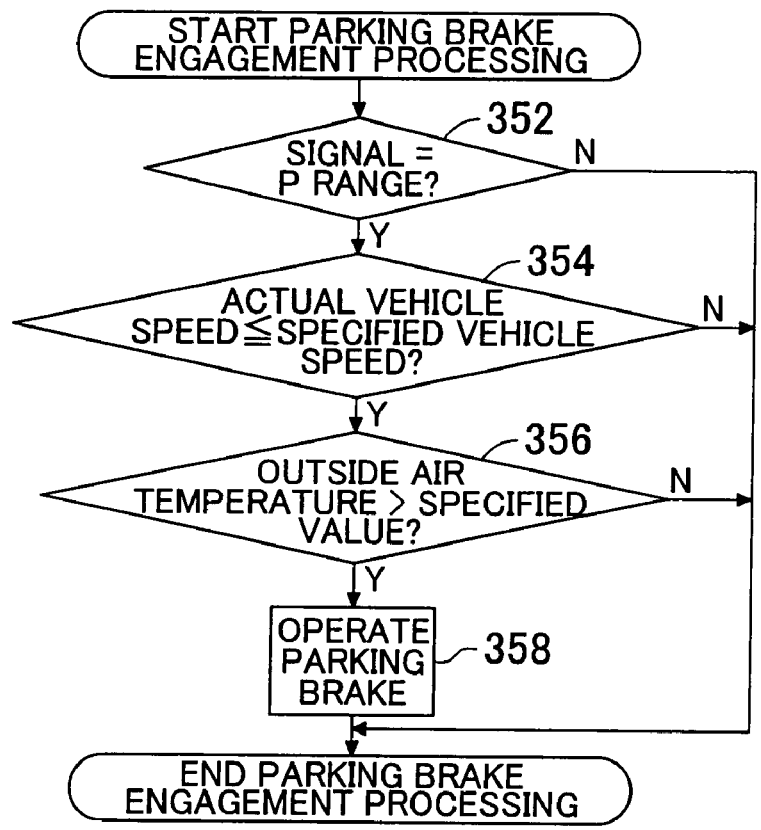
FIG. 9 is a flowchart of a parking brake engagement processing routine that is executed by the automatic transmission ECU shown in FIG. 1.

Parking brake engagement processing is executed according to a parking brake engagement processing routine that is shown in FIG. 9. If the range signal is the Park range (YES at step 352), then if the vehicle speed of the vehicle M, as detected by the vehicle speed sensor 28, is not greater than a specified speed (for example, 5 km/h) (YES at step 354), and if the outside air temperature detected by the outside air temperature sensor 62 is higher than a specified value (for example, 0° C.) (YES at step 356), the automatic transmission ECU 60 operates the motor 51a of the electric PKB unit 50 to put the parking brakes 53 into the braking state (step 358). The automatic transmission ECU 60 then ends the parking brake engagement processing routine.

Note that it is desirable for the electric PKB unit 50 to be operated to put the parking brakes 53 from the released state into the braking state at a point when a specified time has elapsed since the point when YES was determined at step 352. The specified time is set to a time that is necessary and sufficient for the parking mechanism 27 to change from the released state to the engaged state after the shift lever 61 is changed to the P range.

Also, when the range signal is not the Park range (NO at step 352), the automatic transmission ECU 60 ends the parking brake engagement processing routine without operating the motor 51a of the electric PKB unit 50.

If the range signal is the Park range (YES at step 352), but the vehicle speed of the vehicle M is greater than the specified speed (NO at step 354) or the outside air temperature is not higher than the specified value (NO at step 356), the automatic transmission ECU 60 ends the parking brake engagement processing routine without operating the motor 51a of the electric PKB unit 50.

Figure 10:
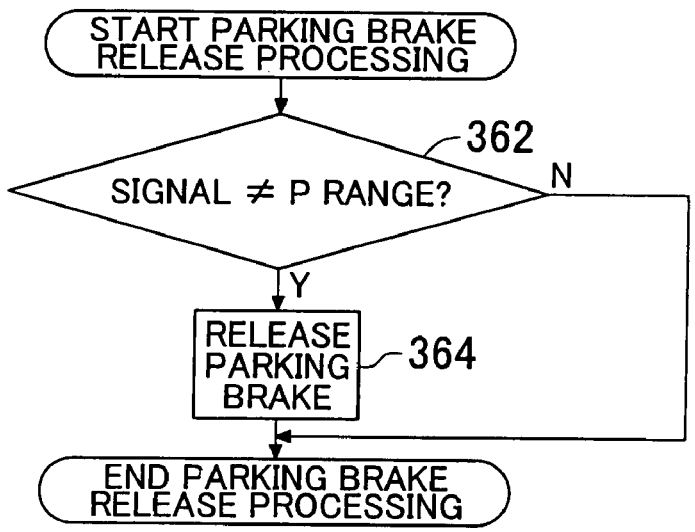
FIG. 10 is a flowchart of a parking brake release processing routine that is executed by the automatic transmission ECU shown in FIG. 1.

Parking brake release processing is executed according to a parking brake release processing routine that is shown in FIG. 10. If the range signal is not the Park range (YES at step 362), the automatic transmission ECU 60 operates the motor 51a of the electric PKB unit 50 to put the parking brakes 53 into the released state (step 364). The automatic transmission ECU 60 then ends the parking brake release processing routine.

Note that it is desirable for the electric PKB unit 50 to be operated to put the parking brakes 53 from the braking state into the released state at a point when a specified time has elapsed since the point when YES was determined at step 362. The specified time is set to a time that is necessary and sufficient for the parking mechanism 27 to change from the engaged state to the released state after the shift lever 61 is changed out of the P range.

If the range signal is the Park range (NO at step 362), the automatic transmission ECU 60 ends the parking brake release processing routine without operating the motor 51a of the electric PKB unit 50.

Next, after the automatic transmission ECU 60 ends the parking brake release processing routine, it ends the actual range position change control routine.

Figure 11:
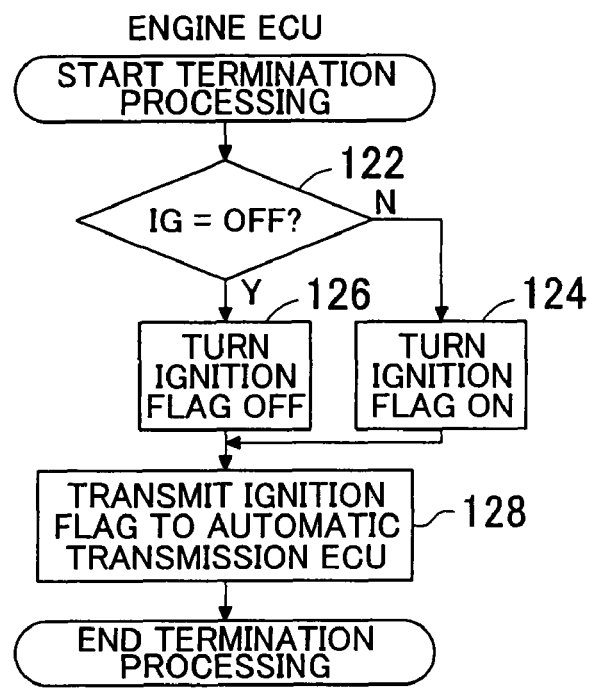
FIG. 11 is a flowchart of a termination processing routine that is executed by the engine ECU shown in FIG. 1.

The engine ECU 16 also executes a termination processing routine that is shown in FIG. 11. That is, while the automatic transmission ECU 60 executes each of the routines described above, as long as the vehicle ignition switch is not turned to OFF (NO at step 122), the engine ECU 16 sets an ignition flag to ON (step 124) and transmits the ignition flag to the automatic transmission ECU 60 (step 128). When the vehicle ignition switch is turned to OFF (YES at step 122), the engine ECU 16 sets the ignition flag to OFF (step 126) and transmits the ignition flag to the automatic transmission ECU 60 (step 128).

Figure 12:
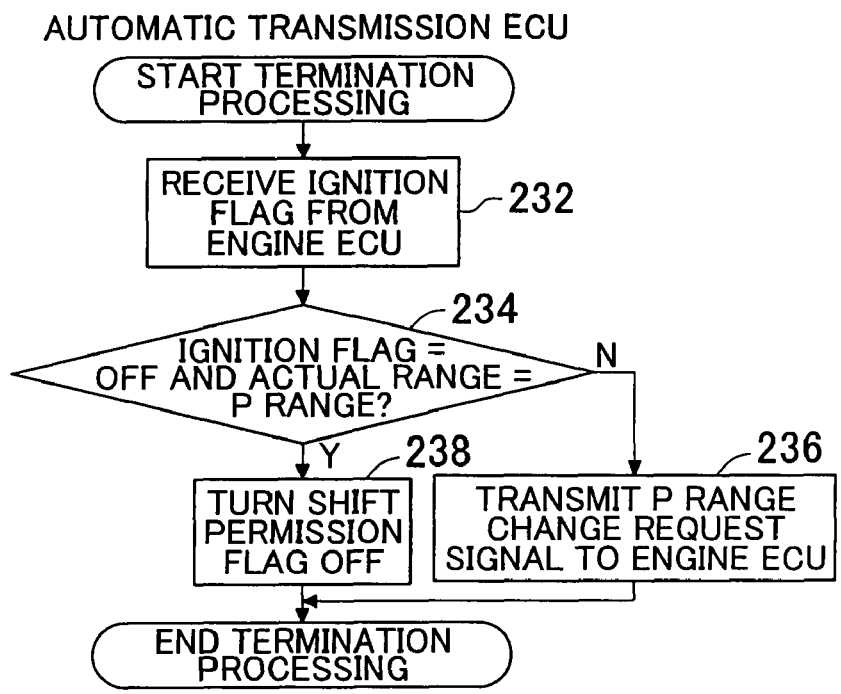
FIG. 12 is a flowchart of a termination processing routine that is executed by the automatic transmission ECU shown in FIG. 1.

The automatic transmission ECU 60 also executes a termination processing routine that is shown in FIG. 12. That is, the automatic transmission ECU 60 receives the ignition flag from the engine ECU 16 (step 232). If the received ignition flag is OFF and the actual range is the Park range (YES at step 234), the automatic transmission ECU 60 sets the shift permission flag to OFF (step 238) and ends the termination processing. If the received ignition flag is ON or the actual range is not the Park range (NO at step 234), the automatic transmission ECU 60 transmits a request signal to the engine ECU 16 to switch to the Park range (step 236), then ends the termination processing.

Figure 13:
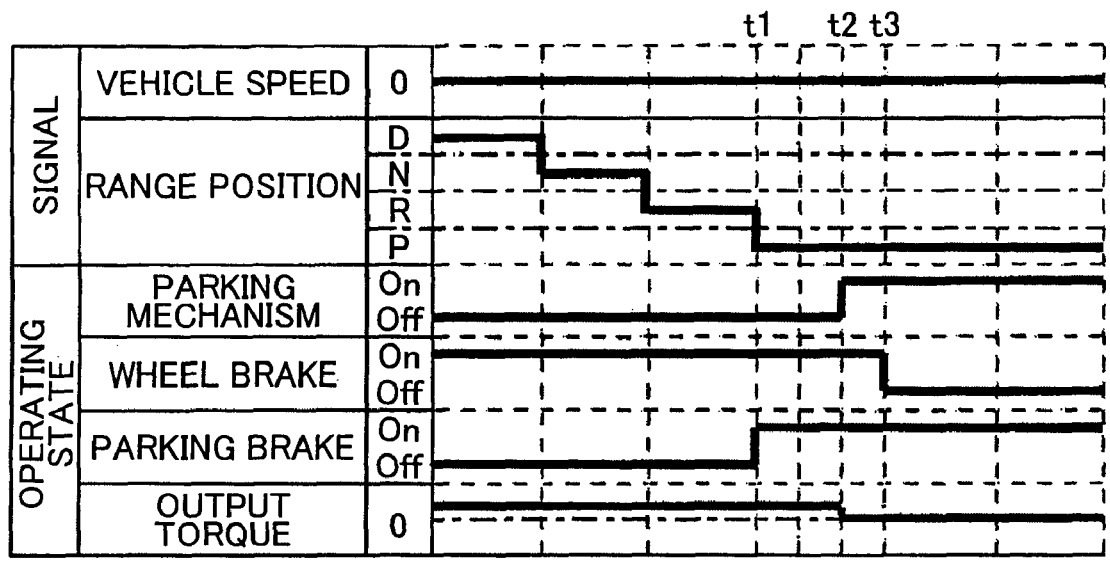
FIG. 13 is a time chart that shows an engagement operation of the vehicle parking control system.

Next, an engagement operation of the vehicle parking control system described above will be explained with reference to a time chart that is shown in FIG. 13. When the vehicle M is parked, if the operator changes the shift lever 61 from the R range to the P range at time t1, the range signal is the P range, the actual range is the R range, the vehicle speed is 0 km/h, and the outside air temperature is higher than the specified value (YES at steps 322, 352, 354, 356), so the automatic transmission ECU 60 operates the motor 51a of the electric PKB unit 50 to change the parking brakes 53 from the released state to the braking state (from OFF to ON) (step 358).

Also, the range-switching device 26 operates in conjunction with the changing of the shift lever 61 from the R range to the P range, and the detent lever 31 rotates to an angle (position) that corresponds to the P range. This causes the parking mechanism 27 to change from the released state to the engaged state (time t2). However, in this case, the parking brakes 53 change from the released state to the braking state sooner than the parking mechanism 27 changes from the released state to the engaged state, so the parking mechanism 27 can be set to the engaged state after the parking brakes 53 are set to the braking state.

Next, at time t3, the operator releases the brake pedal 71, so braking by the wheel brakes is released.

Figure 14:
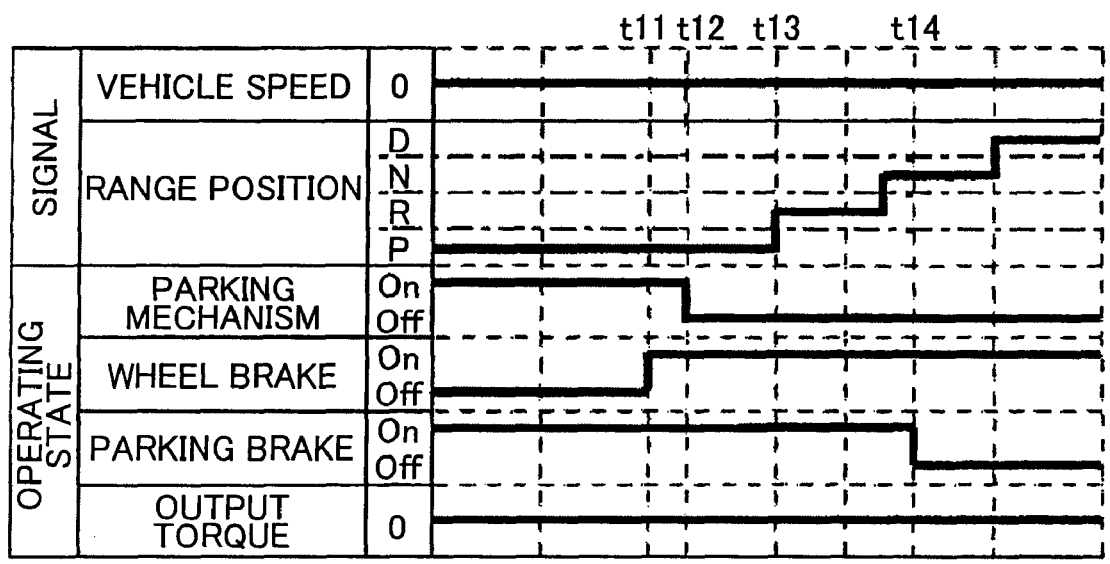
FIG. 14 is a time chart that shows an engagement release operation of the vehicle parking control system.

Next, a release (engagement release) operation of the vehicle parking control system described above will be explained with reference to a time chart that is shown in FIG. 14. When the vehicle M is released from the parked state, if the operator depresses the brake pedal 71 at time t11, the wheel brakes are set to the braking state. If the operator then changes the shift lever 61 from the P range to the R range at time t13, the range-switching device 26 operates in conjunction with the change, and the detent lever 31 rotates to an angle (position) that corresponds to the R range. This causes the parking mechanism 27 to change from the engaged state to the released state (from ON to OFF) (time t12).

Next, because the range signal is the R range and the actual range is the P range (YES at step 362), the automatic transmission ECU 60 operates the motor 51a of the electric PKB unit 50 to change the parking brakes 53 from the braking state to the released state (from ON to OFF) (step 364). This causes the parking brakes 53 to change from the braking state to the released state after the parking mechanism 27 changes from the engaged state to the released state.

Note that in the embodiment described above, the range signal is used as the signal for the processing at step 352 in FIG. 9 and for the processing at step 362 in FIG. 10, but the converted pattern signal described above may also be used. Also, both the range signal and the converted pattern signal may be used. Also, in the processing at step 352 in FIG. 9, the range signal or the converted pattern signal may be used, whichever arrives sooner at the automatic transmission ECU 60. Also, in the processing at step 362 in FIG. 10, the range signal or the converted pattern signal may be used, whichever arrives later at the automatic transmission ECU 60.

Also, in the embodiment described above, the range signal is used as the signal for the processing at step 352 in FIG. 9 and for the processing at step 362 in FIG. 10, but the pattern signal described above may also be used. In that case, at step 352, the processing may determine whether the pattern signal detected by the N switch 35 is a specified value. At step 362, the processing may determine whether the pattern signal detected by the N switch 35 is a specified value.

Figure 15:
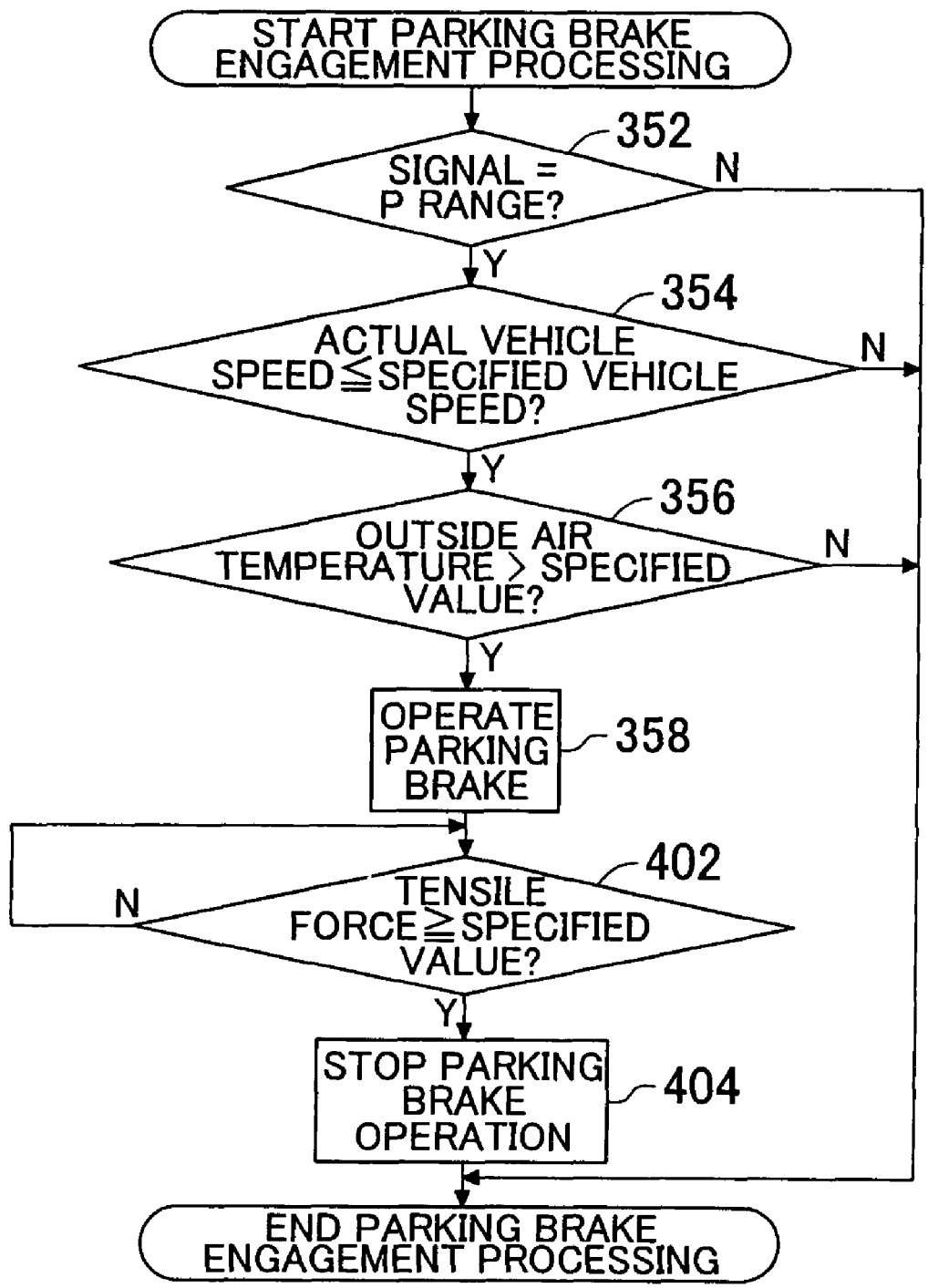
FIG. 15 is a flowchart of another parking brake engagement processing routine that is executed by the automatic transmission ECU shown in FIG. 1.
Figure 17:
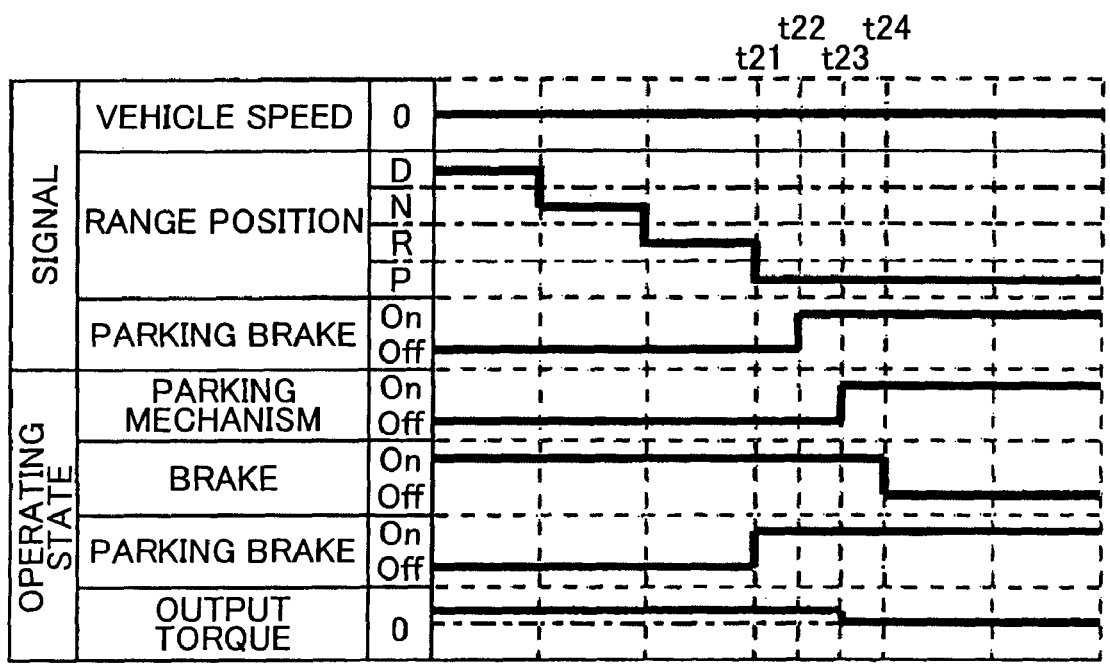
FIG. 17 is a time chart that shows another engagement operation of the vehicle parking control system.
Figure 18:
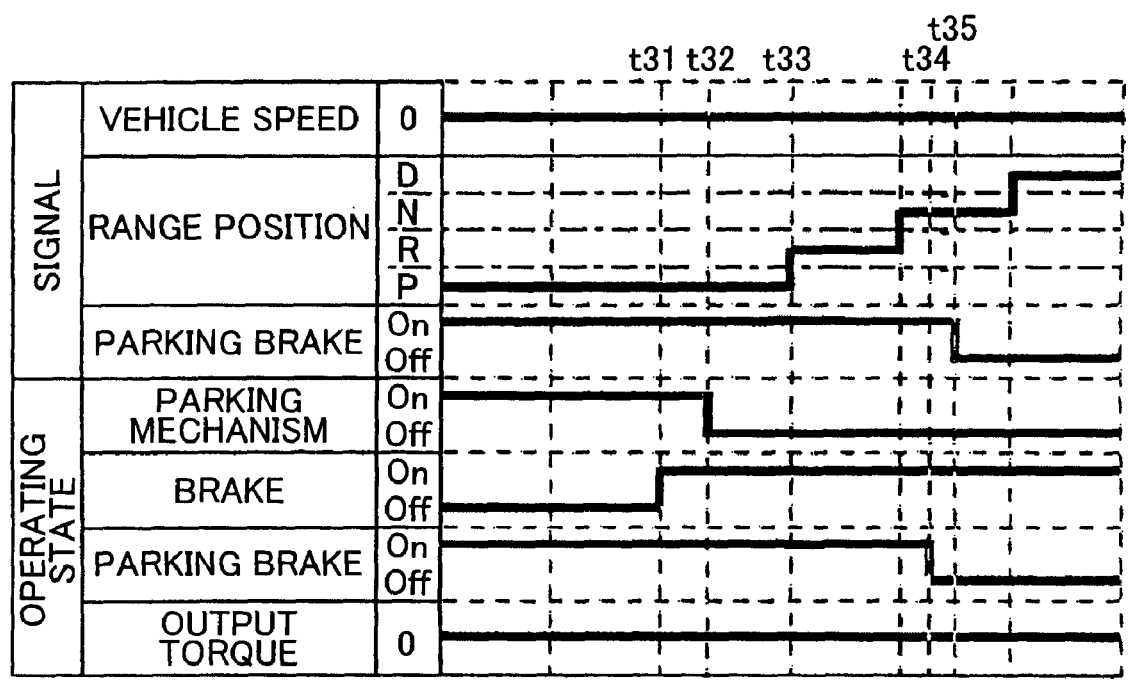
FIG. 18 is a time chart that shows another engagement release operation of the vehicle parking control system.

Also, in the embodiment described above, the parking brake engagement processing and the parking brake release processing may be executed based on the detection result of the tensile force sensor 54 in the electric PKB unit 50. Also, the automatic transmission ECU 60 may execute a parking brake engagement processing routine that is shown in FIG. 15, instead of the parking brake engagement processing routine that is shown in FIG. 9. In this parking brake engagement processing routine, after the automatic transmission ECU 60 operates so as to engage the electric PKB unit 50 at step 358 (time t21 that is shown in FIG. 17), if the tensile force detected by the tensile force sensor 54 becomes equal to or greater than a specified value (time t22) (YES at step 402), the automatic transmission ECU 60 stops the electric PKB unit 50 (step 404). Next, at time t23, the parking mechanism 27 changes from the released state to the engaged state. Then at time t24, the braking of the wheel brakes is released.

Figure 16:
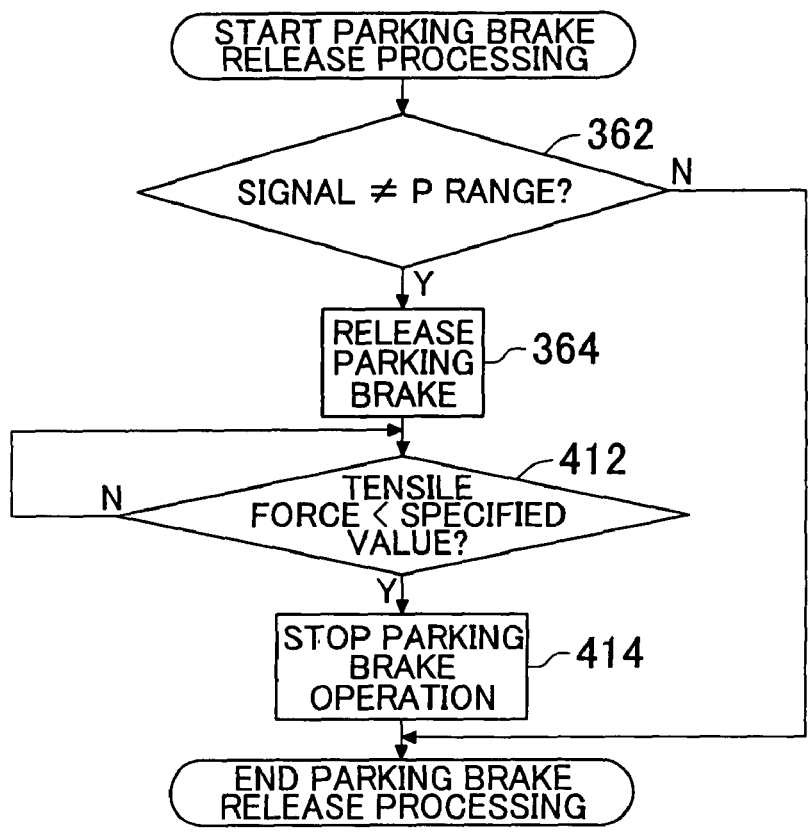
FIG. 16 is a flowchart of another parking brake release processing routine that is executed by the automatic transmission ECU shown in FIG. 1.

The automatic transmission ECU 60 may also execute a parking brake release processing routine that is shown in FIG. 16, instead of the parking brake release processing routine that is shown in FIG. 10. In this parking brake release processing routine, when the shift range is changed from the P range to the R range (time t33), the range-switching device 26 operates in conjunction with the change, and the detent lever 31 rotates to an angle that corresponds to the R range. This causes the parking mechanism 27 to change from the engaged state to the released state (from ON to OFF) (time t32).

Next, the automatic transmission ECU 60 operates the motor 51a of the electric PKB unit 50 such that the parking brakes 53 start operating to change from the braking state to the released state (from ON to OFF) (time t34) (step 364). Next, when the tensile force detected by the tensile force sensor 54 becomes less than a specified value (time t35) (YES at step 412), the automatic transmission ECU 60 stops the electric PKB unit 50 (step 414).

As is clear from the explanation above, in this embodiment, when the operator moves the shift lever 61 to the Park range, the parking mechanism 27 is set to the engaged state by the range-switching device 26, which is mechanically linked to the shift lever 61. Also, when the automatic transmission ECU 60, which is a control unit, detects that the range position signal has changed to the Park range, the automatic transmission ECU 60 operates the electric PKB unit 50, which is the parking unit, based on the range position signal that indicates the Park range. Thus, the parking mechanism 27 can be set to the engaged state, and the parking brakes 53 can apply sufficient braking force, quickly and reliably, thereby reliably preventing the operator from forgetting to engage the parking brakes 53.

Also, when the operator moves the shift lever 61 out of the Park range, the parking mechanism 27 is set to the released state by the range-switching device 26, which is mechanically linked to the shift lever 61. Also, when the automatic transmission ECU 60 detects that the range position signal has changed from the Park range, the automatic transmission ECU 60 operates the electric PKB unit 50 based on the range position signal that indicates a range other than the Park range. Thus, the parking mechanism 27 can be set to the released state, and the parking brakes 53 can be released, quickly and reliably, thereby reliably preventing the operator from forgetting to release the parking brakes 53.

The shift ranges include the Park range, the Reverse range, the Neutral range, and the Drive range. The automatic transmission ECU 60, which is a control unit, operates the electric parking brake unit 50 when the range position signal is a signal to switch the shift range to the Park range or a signal to switch the shift range out of the Park range, so the automatic transmission ECU 60 operates the electric parking brake unit 50 reliably and correctly according to the shift range.

Also, the range position signals include the range command signal, so the electric parking brake unit 50, which is the parking unit, can be operated reliably and correctly according to the operation of the shift lever.

Also, the range position signals include the range state signal, so the electric parking brake unit 50, which is the parking unit, can be operated reliably and correctly according to the actual range state of the automatic transmission 20 (the drive unit).

Also, the range command signal is the range signal, which is a detection signal for the range that is selected by the shift lever 61, which is the range selection device, so the electric parking brake unit 50, which is the parking unit, can be operated with good responsiveness to the operation of the shift lever.

Also, the range state signal is the signal that is output to the automatic transmission ECU 60, which is a control unit, from the N switch 35, which is the range state detection device that detects the shift range state. Therefore, the electric parking brake unit 50, which is the parking unit, can be operated reliably and correctly according to the actual range state.

Also, when the range position signal is the signal to switch the shift range to the Park range, the automatic transmission ECU 60 operates the electric parking brake unit 50, which is the parking unit, to switch the parking brakes 53 to the braking state, thereby reliably preventing the operator from forgetting to engage the parking brakes 53.

Also, when the range position signal is the signal to switch the shift range out of the Park range, the automatic transmission ECU 60 operates the electric parking brake unit 50 to switch the parking brakes 53 to the released state, thereby reliably preventing the operator from forgetting to release the parking brakes 53.

Also, the range position signals are made up of the range command signal and the range state signal, and the electric parking brake unit 50 is operated according to either the range command signal or the range state signal, so the electric parking brake unit 50 can be operated reliably.

Also, the range position signals are made up of the range command signal and the range state signal, and the electric parking brake unit 50 sets the parking brakes 53 to the braking state according to either the range command signal or the range state signal, while according to the other signal, the parking brakes 53 are set to the released state, so the parking brakes 53 can be engaged and released reliably.

Also, the parking brakes 53 are set to the braking state before the parking mechanism 27 is set to the engaged state. Thus, when the operator parks the vehicle, the parking mechanism 27 is set to the engaged state based on a circumstance in which the vehicle is in a parked state, with the wheels held stationary and the like, and there is no movement in the output shaft 24 of the automatic transmission (the drive unit). Therefore, the generation of loud noise and shock resulting from the engagement of the parking mechanism 27 while the output shaft 24 is rotating can reliably be prevented.

Also, the parking brakes 53 are set to the released state at or after the time when the parking mechanism 27 is set to the released state. Thus, when the operator releases the vehicle from the parked state, the parking mechanism 27 is set to the released state based on a circumstance in which the vehicle is parked, with the wheels held stationary and the like, and there is no movement in the output shaft 24 of the automatic transmission (the drive unit). Therefore, the generation of loud noise and shock resulting from the release of the parking mechanism 27 while the output shaft 24 is rotating can reliably be prevented.

Also, the vehicle parking brake unit may be structured from at least one of the electric parking brake unit 50, which is the parking brake unit that operates the parking brakes 53, and the hydraulic brake unit, which is the wheel brake unit that operates the wheel brakes. Either the parking brake unit or the wheel brake unit is set to the braking state before the parking mechanism 27 is set to the engaged state. Thus, when the operator parks the vehicle, it is possible to engage the parking brakes after the wheel brakes are engaged and to set the parking mechanism to the engaged state after the output shaft of the automatic transmission (the drive unit) stops moving, while ensuring a high degree of freedom in design.

Also, the vehicle parking brake unit may be structured from at least one of the electric parking brake unit 50, which is the parking brake unit that operates the parking brakes 53, and the hydraulic brake unit, which is the wheel brake unit that operates the wheel brakes. Either the parking brake unit or the wheel brake unit is set to the released state at or after the time when the parking mechanism is set to the released state. Thus, when the operator releases the vehicle from the parked state, it is possible to release the wheel brakes after the parking brakes are released and to release the vehicle from the parked state after the parking mechanism is set to the released state, while ensuring a high degree of freedom in design.

Note that in the embodiment described above, the electric PKB unit 50 is controlled by the automatic transmission ECU 60, but a control unit that exclusively controls the electric PKB unit 50 may also be provided, and the electric PKB unit 50 may be controlled by that control unit.

Also, in the embodiment described above, the parking brakes of the electric PKB unit 50 are wheel types that are provided on the wheels, but the parking brakes may be center types in which braking is applied by drum brakes or the like on the propeller shaft.

Note that the embodiment described above was explained using an example of a vehicle equipped with an automatic transmission, but a vehicle equipped with a drive unit that is not an automatic transmission may also be used. For example, a hybrid vehicle or the like without an automatic transmission falls into this category. In the case of a hybrid vehicle, the range selection device, such as the shift lever or the like that is operated by the operator, can select the P range, the R range, the N range, the D range, and the like in the conventional manner. However, in the parking mechanism that is provided in the drive unit, the detent lever that is used is set such that, in the P range, the parking mechanism that is provided in the drive unit engages, in the same manner as with the automatic transmission, but in the R range, the N range, and the D range, the parking mechanism releases, unlike with the automatic transmission. Although this case is different from the automatic transmission case on this point, the detent lever still has the role of switching the parking mechanism to the engaged state and the released state. Therefore, even in this case, the control flow that is explained in the embodiment described above can be used, and the angle signal, which is the range state signal, instead of indicating the position of the manual valve, indicates whether the detent lever, which switches the parking mechanism to the engaged state and the released state, is in the P range or is in the R range, the N range, or the D range. Moreover, in the case of a hybrid or the like, there are times when the drive unit itself is not set to the Park range, the Reverse range, the Neutral range, the Drive range, or the like, but at those times, the control unit that controls the drive unit operates the drive unit in a manner that is equivalent to the respective ranges. Therefore, even at those times, the embodiment described above can be practiced.

In the present invention according to a first exemplary aspect, when the operator moves the range selection device to the Park range position, and when the control unit detects that the range position signal has changed to the Park range, the control unit operates the vehicle parking brake unit based on the range position signal that indicates the Park range. Thus, the parking mechanism can be set to the engaged state, and the vehicle parking brake unit, as the parking brake, can apply sufficient braking force, quickly and reliably, thereby reliably preventing the operator from forgetting to engage the parking brake.

Also, when the operator moves the range selection device of the drive unit out of the Park range position, and when the control unit detects that the range position signal has changed from the Park range, the control unit operates the vehicle parking brake unit based on the range position signal that indicates a range other than the Park range. Thus, the parking mechanism can be set to the released state, and the vehicle parking brake unit can release the parking brake, quickly and reliably, thereby reliably preventing the operator from forgetting to release the parking brake.

Also, when the operator moves the range selection device of the automatic transmission out of the Park range position, and when the control unit detects that the range position signal has changed from the Park range, the control unit operates the vehicle parking brake unit based on the range position signal that indicates a range other than the Park range. Thus, the parking mechanism can be set to the released state, and the vehicle parking brake unit can release the parking brake, quickly and reliably, thereby reliably preventing the operator from forgetting to release the parking brake.

According to another exemplary aspect of the invention, the control unit operates the vehicle parking brake unit reliably and correctly according to a switch to the Park range and a switch out of the Park range.

According to another exemplary aspect of the invention, the vehicle parking brake unit operates reliably and correctly according to the operation of the range selection device.

According to another exemplary aspect of the invention, the vehicle parking brake unit operates reliably and correctly according to an actual range state of the automatic transmission (the drive unit).

According to another exemplary aspect of the invention, the vehicle parking brake unit operates with good responsiveness to the operation of the range selection device.

According to another exemplary aspect of the invention, when the operator releases the vehicle from the parked state, the vehicle is released from the parked state after the lock mechanism is set to the released state based on a circumstance in which the vehicle is parked, with the wheels held stationary and the like, and there is no movement in the output shaft of the automatic transmission (drive unit). Therefore, the generation of loud noise and shock resulting from the release of the lock mechanism while the output shaft is rotating can reliably be prevented.

According to another exemplary aspect of the invention, when the operator parks the vehicle, it is possible to engage the parking brake after the wheel brake is engaged and to set the lock mechanism to the engaged state after the output shaft of the automatic transmission (drive unit) stops moving, while ensuring a high degree of freedom in design.

According to another exemplary aspect of the invention, when the operator releases the vehicle from the parked state, it is possible to release the wheel brake after the parking brake is released and to release the vehicle from the parked state after the lock mechanism is set to the released state, while ensuring a high degree of freedom in design.

According to another exemplary aspect of the invention, when the range position signal is switched to the Park range, the control unit of the drive unit sets the brake unit to the braking state. Thus, the operator is reliably prevented from forgetting to engage the parking brake.

According to another exemplary aspect of the invention, when the range position signal is switched out of the Park range, the control unit of the drive unit sets the brake unit to the released state. Thus, the operator is reliably prevented from forgetting to release the parking brake.

According to another exemplary aspect of the invention, when the range position signal is switched to the Park range, the control unit of the automatic transmission sets the brake unit to the braking state. Thus, the operator is reliably prevented from forgetting to engage the parking brake.

According to another exemplary aspect of the invention, when the range position signal is switched out of the Park range, the control unit of the automatic transmission sets the brake unit to the released state. Thus, the operator is reliably prevented from forgetting to release the parking brake.

What is claimed is:

1. A vehicle parking control system for a vehicle with a drive unit and a range selection device, the drive unit including an output shaft that is connected through a rotating member to a wheel of the vehicle and a lock mechanism that disengageably engages the output shaft to prevent the output shaft from rotating, and the range selection device being operated by an operator that is capable of selecting a driving range and a Park range, which is a non-driving range, of the drive unit, comprising:
   a range-switching device that operates in conjunction with the range selection device and that switches the lock mechanism to an engaged state and a released state in conjunction with a switching of one of the driving range and the Park range, which is the non-driving range, of the drive unit;
   a vehicle parking brake unit that is operated based on an electric range position signal, which corresponds to the driving range and the Park range, which is the non-driving range, of the drive unit, and that switches a brake unit, which is provided to stop a rotation of the rotating member of the vehicle, between a braking state and a released state; and
   a control unit that operates the vehicle parking brake unit to switch the brake unit to the released state at or after a time when the range position signal is a signal to switch a shift range out of the Park range, which is the non-driving range, and the lock mechanism is set to the released state.

2. The vehicle parking control system according to claim 1, wherein:
   the driving range includes a Reverse range and a Drive range; and
   the control unit operates the vehicle parking brake unit when the range position signal is one of a signal to switch to the Park range, which is the non-driving range, and the signal to switch the shift range out of the Park range, which is the non-driving range.

3. The vehicle parking control system according to claim 2, wherein the range position signal is a range command signal.

4. The vehicle parking control system according to claim 2, wherein the range position signal is a range state signal.

5. The vehicle parking control system according to claim 3, wherein the range command signal is a range signal that is output from the range selection device to the control unit.

6. The vehicle parking control system according to claim 4, wherein the range state signal is a signal that is output to the control unit from a range state detection device that detects a state of one of the driving range and the non-driving range.

7. The vehicle parking control system according to claim 2, wherein when the range position signal is the signal to switch to the Park range, which is the non-driving range, the control unit operates the vehicle parking brake unit to switch the brake unit to the braking state.

8. The vehicle parking control system according to claim 2, wherein:
   the range position signal is made up of a range command signal and a range state signal; and
   the vehicle parking brake unit is operated according to one of the range command signal and the range state signal.

9. The vehicle parking control system according to claim 2, wherein:
   the range position signal is made up of a range command signal and a range state signal;

the vehicle parking brake unit sets the brake unit to the braking state, according to one of the range command signal and the range state signal; and the vehicle parking brake unit sets the brake unit to the released state, according to the other of the range command signal and the range state signal.

10. The vehicle parking control system according to claim 7, wherein:

the vehicle parking brake unit is structured from at least one of an electric parking brake unit that is operated based on an electric signal and a wheel brake unit that operates a wheel brake; and one of the electric parking brake unit and the wheel brake unit is set to the braking state.

11. The vehicle parking control system according to claim 10, wherein one of the electric parking brake unit and the wheel brake unit is set to the released state at one of the time when the lock mechanism is set to the released state and a time after the time when the lock mechanism is set to the released state.

* * * * *